US008772685B2

(12) United States Patent
Backaert et al.

(10) Patent No.: US 8,772,685 B2
(45) Date of Patent: Jul. 8, 2014

(54) MICROWAVE STEAM COOKING CONTAINER SYSTEM

(75) Inventors: Dimitri M. C. J. Backaert, Moorsel (BE); Maartkin Demuynck, Nevele (BE)

(73) Assignee: Dart Industries Inc., Orlando, FL (US)

( * ) Notice: Subject to any disclaimer, the term of this patent is extended or adjusted under 35 U.S.C. 154(b) by 550 days.

(21) Appl. No.: 12/562,283

(22) Filed: Sep. 18, 2009

(65) Prior Publication Data

US 2010/0163553 A1 Jul. 1, 2010

Related U.S. Application Data

(60) Provisional application No. 61/193,861, filed on Dec. 31, 2008.

(51) Int. Cl.
*H05B 6/64* (2006.01)
*A47J 36/02* (2006.01)
*H05B 6/80* (2006.01)
*B65D 81/34* (2006.01)
*A47J 27/04* (2006.01)

(52) U.S. Cl.
CPC .............. *A47J 36/027* (2013.01); *H05B 6/804* (2013.01); *B65D 81/3423* (2013.01); *B65D 81/3446* (2013.01); *A47J 27/04* (2013.01)
USPC ........... 219/682; 219/688; 219/731; 219/734; 219/759

(58) Field of Classification Search
CPC ..... H05B 6/6479; H05B 6/804; A47J 36/027; B65D 81/3423; B65D 81/3446
See application file for complete search history.

(56) References Cited

U.S. PATENT DOCUMENTS

| 3,641,926 | A | 2/1972 | Williams et al. |
| 3,985,990 | A | 10/1976 | Levinson |
| 4,010,736 | A | 3/1977 | Sacomani et al. |
| 4,258,695 | A | 3/1981 | McCarton et al. |
| 4,306,133 | A | 12/1981 | Levinson |
| 4,317,017 | A | 2/1982 | Bowen |
| 4,413,167 | A | 11/1983 | Martel et al. |
| 4,439,656 | A | 3/1984 | Peleg |
| D275,547 | S | 9/1984 | Asti et al. |
| 4,486,640 | A | 12/1984 | Bowen et al. |
| 4,509,412 | A | 4/1985 | Whittenburg et al. |
| 4,528,975 | A | 7/1985 | Wang |
| 4,663,506 | A | 5/1987 | Bowen et al. |
| 4,739,698 | A | 4/1988 | Allaire |

(Continued)

FOREIGN PATENT DOCUMENTS

| DE | 32 42 402 A1 | 5/1983 |
| GB | 2 112 257 A | 11/1982 |

(Continued)

*Primary Examiner* — Alonzo Chambliss
(74) *Attorney, Agent, or Firm* — John A. Doninger

(57) ABSTRACT

A microwave steam cooking container system for cooking foodstuff, comprising a water reservoir, a food container comprising a plurality of apertures on a bottom thereof, an outer wall portion and an inner wall portion, and a microwave shielding material encapsulated between said inner and outer wall portions, a cover comprising an inner wall portion and an outer wall portion, and a microwave shielding material encapsulated between said cover inner and said cover outer wall portions, wherein said food container is stacked and removably placed within said water reservoir, wherein in the assembled position the foodstuff to be cooked is shielded from cooking by direct exposure to microwave energy.

7 Claims, 7 Drawing Sheets

(56) References Cited

U.S. PATENT DOCUMENTS

| | | | |
|---|---|---|---|
| 4,923,704 | A | 5/1990 | Levinson |
| 4,952,765 | A | 8/1990 | Toyosawa |
| 4,959,517 | A | 9/1990 | Jump et al. |
| 5,008,507 | A | 4/1991 | Pesheck et al. |
| 5,065,889 | A | 11/1991 | Conti |
| 5,107,087 | A | 4/1992 | Yamada et al. |
| 5,144,106 | A | 9/1992 | Kearns et al. |
| D333,754 | S | 3/1993 | Conti |
| D335,795 | S | 5/1993 | Conti |
| 5,223,291 | A | 6/1993 | Levinson et al. |
| D338,807 | S | 8/1993 | Conti |
| D345,485 | S | 3/1994 | Leung |
| 5,387,781 | A | 2/1995 | Berkoff |
| D367,582 | S | 3/1996 | Desbarres |
| 5,521,361 | A | 5/1996 | Strait, Jr. |
| 5,558,798 | A | 9/1996 | Tsai |
| D381,553 | S | 7/1997 | Candianides |
| D414,375 | S | 9/1999 | Diulius |
| D420,848 | S | 2/2000 | Neidigh |
| D449,958 | S | 11/2001 | Liu |
| D471,757 | S | 3/2003 | Kitamura et al. |
| 6,803,551 | B2 | 10/2004 | Kim et al. |
| D511,268 | S | 11/2005 | Ryan |
| D514,372 | S | 2/2006 | Kaposi et al. |
| 7,067,778 | B2 * | 6/2006 | Kim ............................... 219/682 |
| D530,564 | S | 10/2006 | Chiba |
| D542,082 | S | 5/2007 | Spiegel et al. |
| D557,551 | S | 12/2007 | Tetreault et al. |
| D557,972 | S | 12/2007 | Ablo |
| 7,378,625 | B2 | 5/2008 | Richardson et al. |
| D613,131 | S * | 4/2010 | Chen et al. ..................... D7/667 |
| 8,071,923 | B2 * | 12/2011 | McMahan ..................... 219/725 |
| 2005/0184064 | A1* | 8/2005 | Ohyama ....................... 219/725 |
| 2006/0019001 | A1 | 1/2006 | Levinson |
| 2006/0049189 | A1 | 3/2006 | Golden et al. |
| 2006/0118552 | A1 | 6/2006 | Tiefenback |
| 2006/0237451 | A1 | 10/2006 | Sameuls et al. |
| 2007/0158339 | A1 | 7/2007 | Beckman |
| 2008/0230176 | A1 | 9/2008 | Van De Weijer et al. |
| 2009/0107993 | A1* | 4/2009 | Ohyama ....................... 219/731 |

FOREIGN PATENT DOCUMENTS

| | | |
|---|---|---|
| JP | 57-161426 | 10/1982 |
| JP | 3-13924 | 2/1991 |
| JP | 05268892 | 10/1993 |
| JP | 2000-166762 | 6/2000 |
| KR | 20-0300270 | 12/2002 |
| WO | WO 2008/036785 A2 | 3/2008 |

* cited by examiner

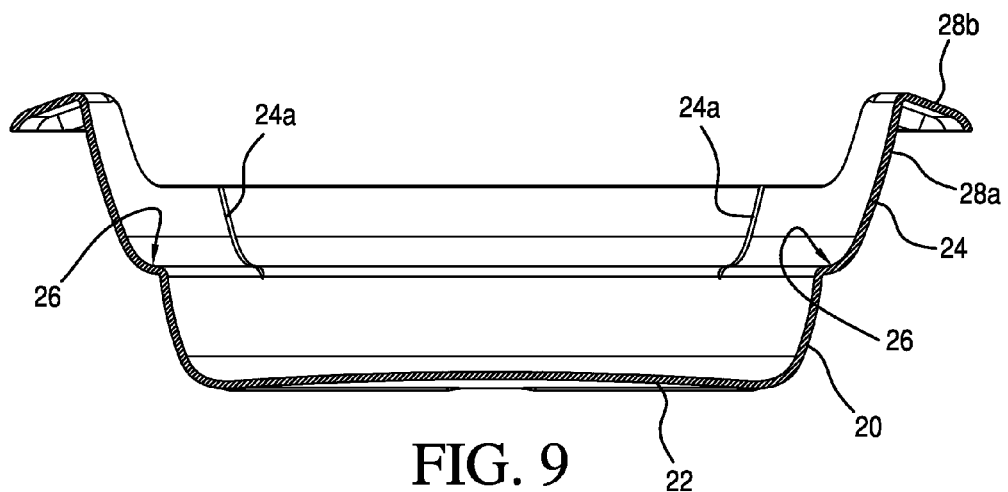
FIG. 9
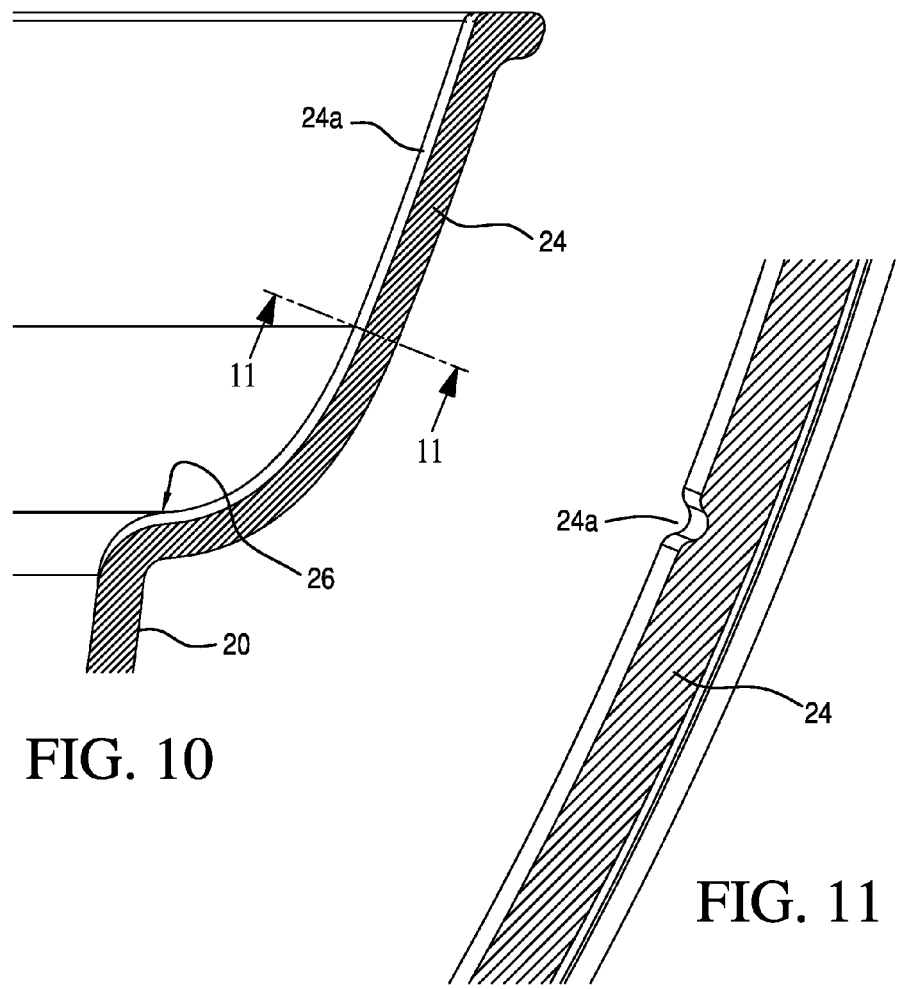
FIG. 10
FIG. 11

MICROWAVE STEAM COOKING CONTAINER SYSTEM

CROSS-REFERENCE TO RELATED APPLICATIONS

This application claims the benefit of U.S. Provisional Application No. 61/193,861, filed Dec. 31, 2008.

FIELD OF THE INVENTION

The present invention is directed toward a microwavable container system, and more particularly, toward a container system for cooking foodstuff in a microwave oven essentially exclusively using steam.

BACKGROUND OF THE INVENTION

Prior art microwave steam containers often include a microwave shielding material, such as metal, usually in the form of a separate metallic element that is visible to the user and removable from a part of the container. Being aware of the metallic components, however, users are often reluctant to place such items into a microwave oven, with the result that foodstuff in these microwave steam containers will not be cooked efficiently and in the manner intended by the microwave container manufacturer.

The prior art includes conventional stove top steamers that cook foodstuff by heating water in a lower container to create steam which cooks foodstuff present in a covered upper container. In such cases, the foodstuff is cooked essentially entirely with steam.

The prior art also includes microwave cooking containers that heat water in a lower container to create steam which cooks foodstuff in a covered upper container. In such cases, the foodstuff is cooked by a combination of steam and direct exposure to microwaves.

It is therefore a primary object of the present invention to provide a microwave steam cooking container system which contains a microwave shielding element that is encapsulated and hidden within the microwave transmitting material of the container and a cover to allow for cooking of foodstuff essentially exclusively with steam.

It is another object of this invention to provide a microwave steam cooking container system which allows efficient stacked cooking of foodstuff.

BRIEF SUMMARY OF THE INVENTION

The aforementioned problems and others are addressed by the microwave steam cooking container system of the invention. More particularly, the invention comprises a water reservoir; a food container having a plurality of apertures on the bottom thereof, and an outer wall portion and an inner wall portion, and a microwave shielding material encapsulated between the inner and outer wall portions; and a cover comprising an inner wall portion and an outer wall portion, and a microwave shielding material encapsulated between the inner and the outer cover wall portions; wherein the food container is stacked and removably placed within the water reservoir.

An optional strainer comprising a plurality of apertures may be stacked and removably placed within the food container, and the cover is removably placed on top of the strainer to allow stacked cooking of multiple foodstuff. The apertures facilitate stacked cooking by allowing the steam to envelop the foodstuff within the strainer.

BRIEF DESCRIPTION OF THE SEVERAL VIEWS OF THE DRAWINGS

These and other objects of the present invention will be appreciated and understood by those skilled in the art from the detailed description of the preferred embodiments of the invention and the following drawings of which:

FIG. 9 is a cross-sectional view taken along line 9-9 of FIG. 8;

FIG. 10 is a cross-sectional view taken along line 10-10 of FIG. 9; and

FIG. 11 is a cross-sectional view taken along line 11-11 of FIG. 10.

DETAILED DESCRIPTION OF THE INVENTION

Figure 1:
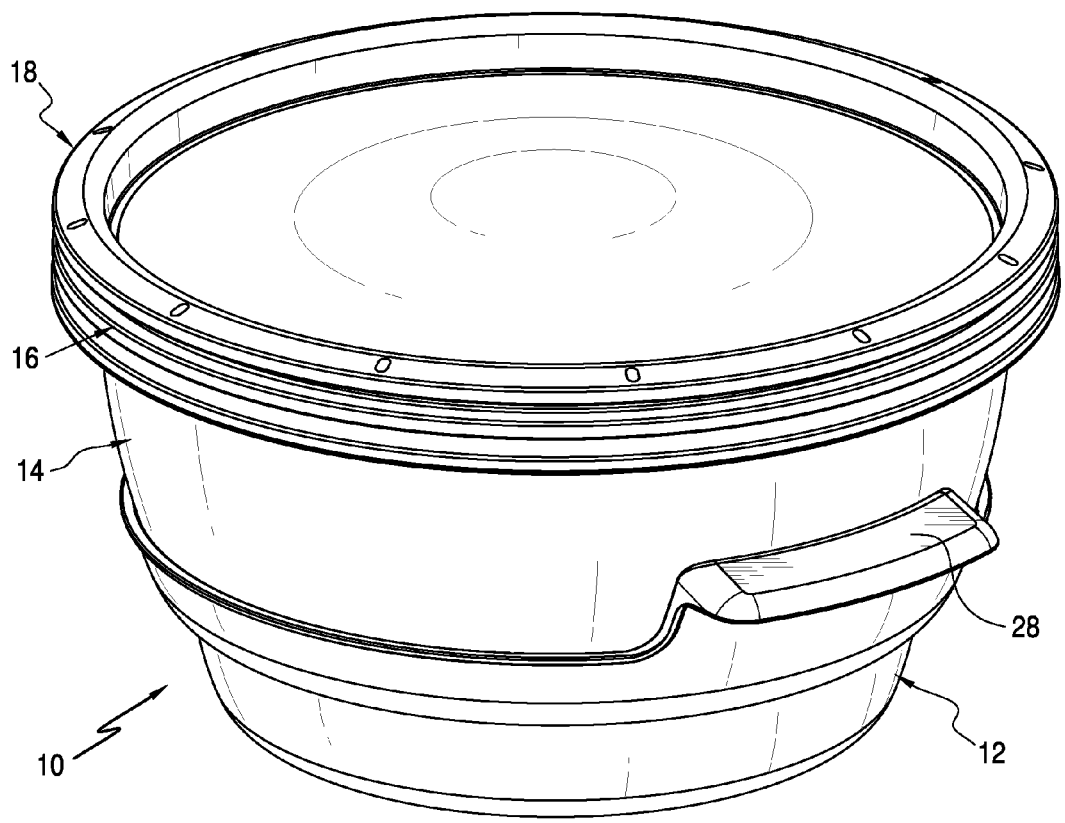
FIG. 1 is a perspective view of the microwave steam cooking container system according to the preferred embodiment of the present invention in a stacked and assembled configuration.
Figure 2:
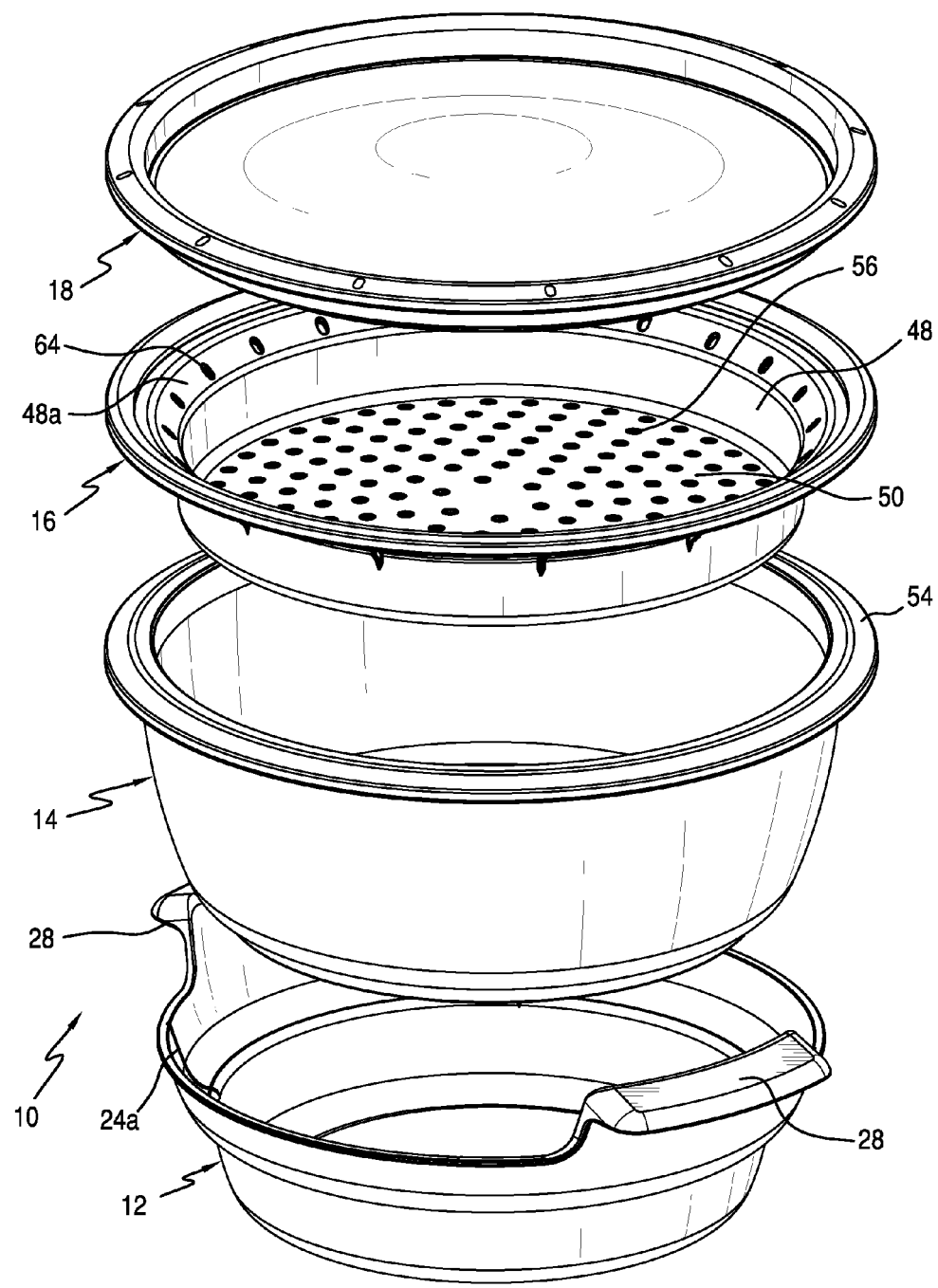
FIG. 2 is a perspective exploded view of the microwave steam cooking container system illustrated in FIG. 1.
Figure 3:
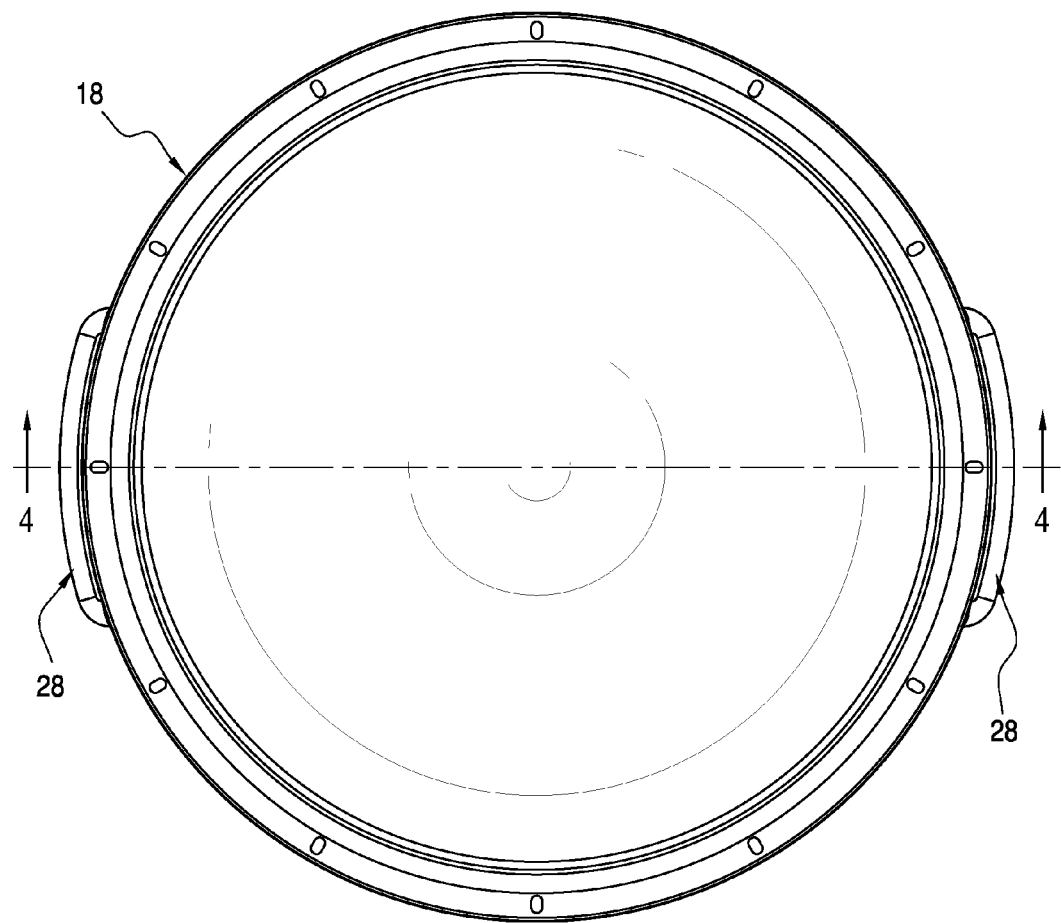
FIG. 3 is a top plan view of the microwave steam cooking container system shown in FIG. 2.

Referring now to the drawings, wherein the showings are for the purpose of illustrating the preferred embodiment of the invention only and not for the purpose of limiting the same, a microwave steam cooking container system is illustrated at 10 in a stacked and assembled configuration in FIG. 1, and in an exploded and separated configuration in FIG. 2.

The microwave steam cooking container system 10 primarily comprises a water reservoir 12, a food container 14, an optional basket or strainer 16, and a cover or lid 18, wherein, as will be explained in greater detail herein, the food container 14 is stacked on top of and removably placed within the water reservoir 12, the strainer 16 is stacked on top of and removably placed within the food container 14, and the cover 18 is removably placed on top of the strainer 16.

Figure 7:
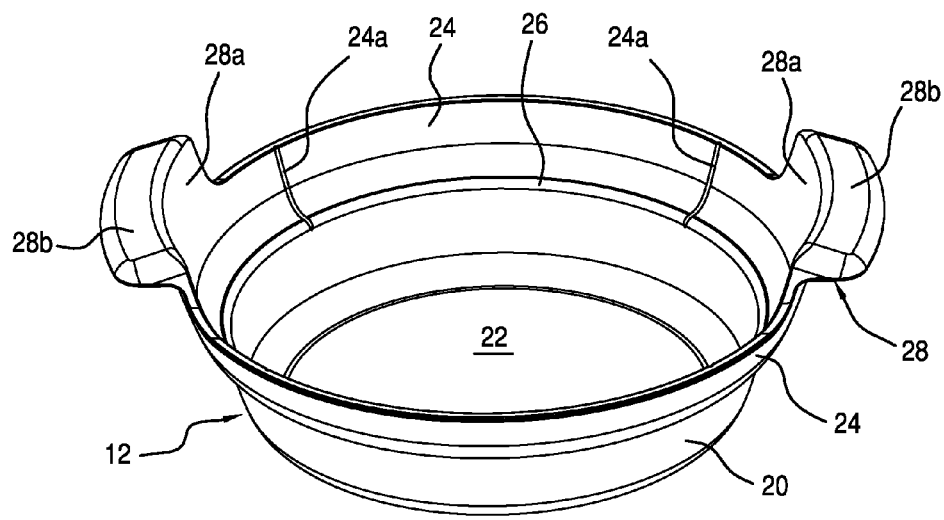
FIG. 7 is a top perspective view of the water reservoir.
Figure 8:
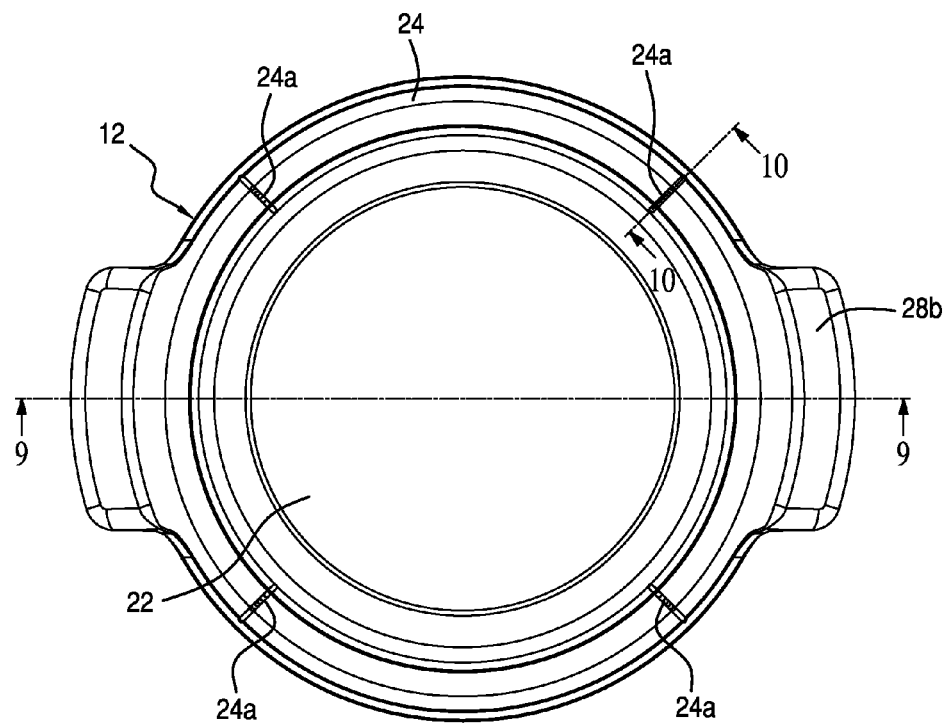
FIG. 8 is a top plan view of the water reservoir.

Referring more specifically to FIGS. 7 and 9, the water reservoir 12 is primarily made from microwave transmitting material, such as, but not limited to, plastic, and includes a first wall section 20 and a bottom 22, wherein the first wall section 20 bounds a top opening having a first diameter. The water reservoir 12 further includes a second wall section 24 which bounds an opening having a second diameter larger than the first diameter, and wherein the second wall section 24 is integral with the first wall section 20 at a point which forms a support ledge 26. A pair of oppositely positioned annular peripheral handles 28 extends upwardly and outwardly from the upper edge of the second wall section 24.

The handles each include an upwardly extending portion 28a and an outwardly and downwardly extending finger-grip portion 28b. This configuration allows the user to lift all four components of the microwave steam cooking container system 10 in an assembled configuration without the user's hand risking contact with the heat and steam generated within the lower area of the water reservoir 12 bounded by the first wall section 20. As can best be seen in FIGS. 1 and 4, the handles 28 are positioned well above the support ledge 26. This maximizes the vertical distance between the support ledge 26 and the handles 28, thus lessening the possibility that the user's fingers or thumbs will come in contact with steam that could escape from the water reservoir 12.

Figure 4:
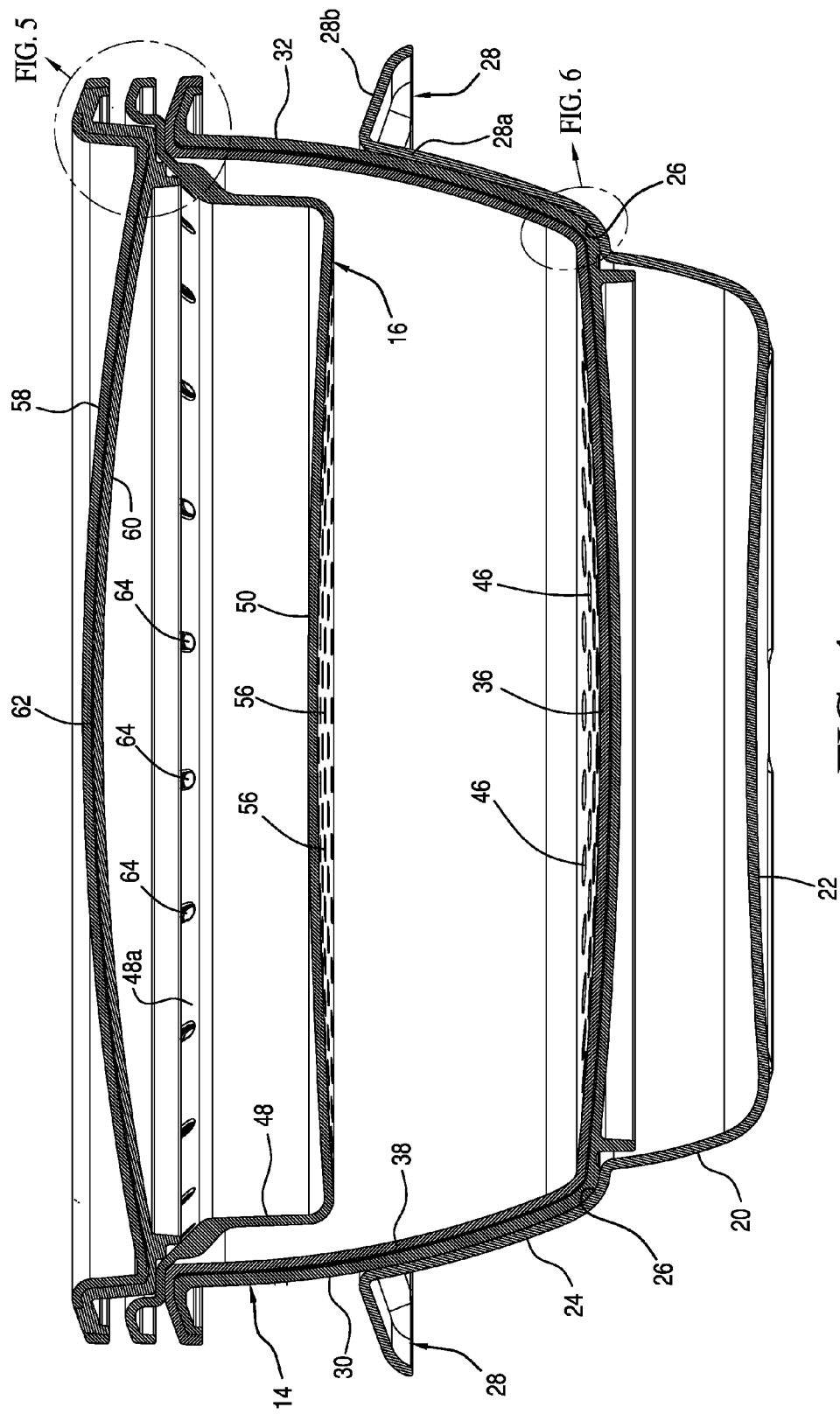
FIG. 4 is a sectional view of the microwave steam cooking container system taken along line 4-4 of FIG. 3.
Figure 6:
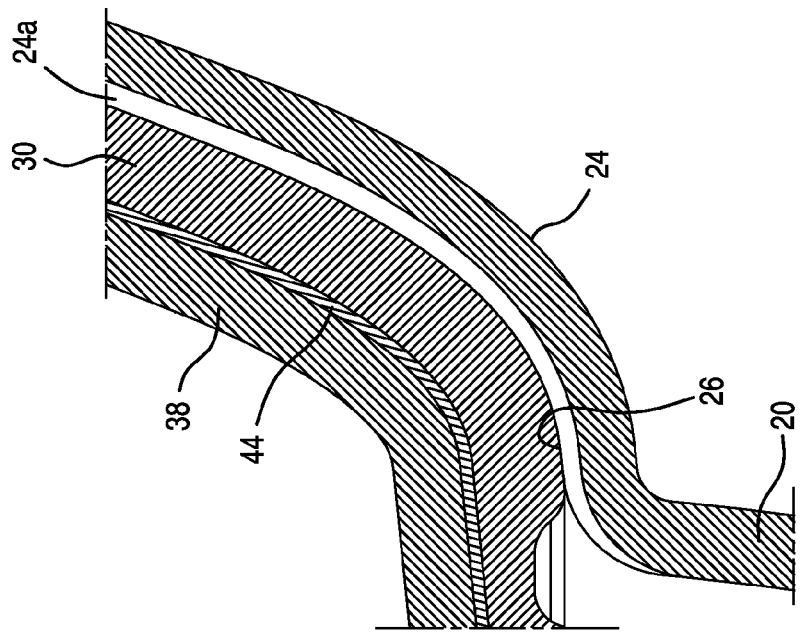
FIG. 6 is an enlarged detail view taken from FIG. 4.
Figure 5:
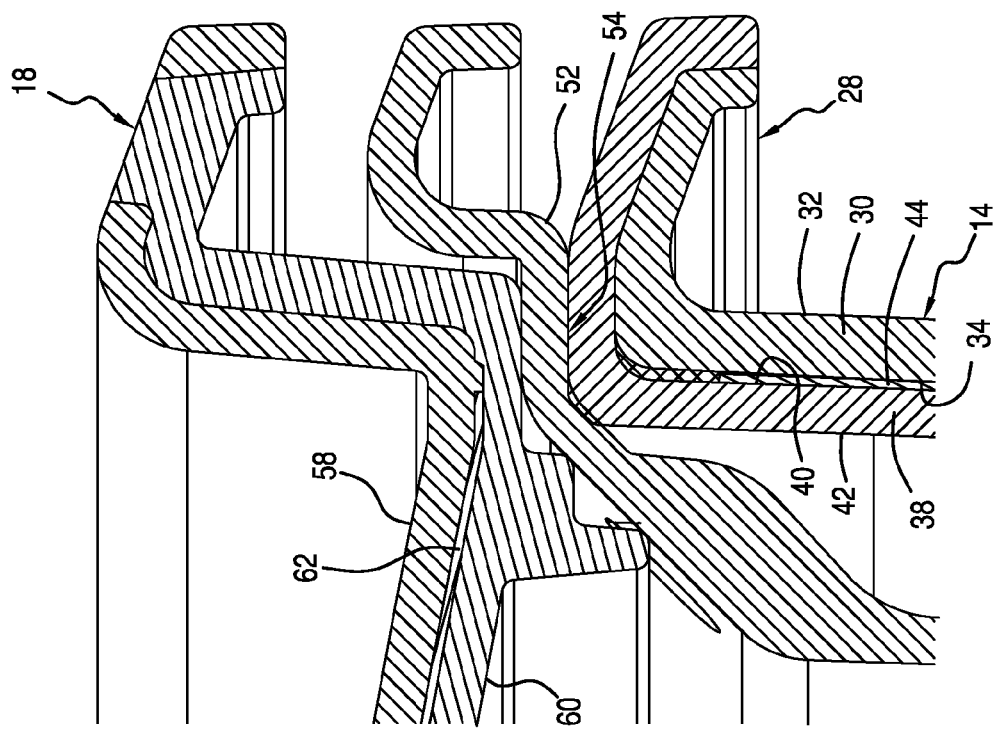
FIG. 5 is an enlarged detail view taken from FIG. 4.

Referring more specifically to FIGS. 4 and 5, the food container 14 is primarily made from microwave transmitting material, such as, but not limited to, plastic, and includes an outer wall portion 30 having an outer surface 32 and an inner surface 34, a bottom 36, and an inner wall portion 38 having an outer surface 40 and an inner surface 42. The food container 14 further includes microwave shielding material, such as tin 44 or some other microwave shielding metal or metal alloy, which is permanently encapsulated and overmolded between the inner wall portion 38 and the outer wall portion 30 contacting the inner surface 34 of the outer wall portion 30 on one side and outer surface 40 of the inner wall portion 38 on the other side, and extending the length of the wall portions 30, 38 and the bottom 36 of the food container 10. With this arrangement, it can readily be appreciated that foodstuff placed inside the food container 14 is cooked with steam only, without exposing the foodstuff directly to microwave radiation.

As stated hereinabove, one advantage of having a microwave shielding material that is permanently encapsulated within and hidden between the inner 38 and outer 30 wall portions of the food container 14 is that users who are otherwise reluctant to place a metallic object in a microwave oven will be unaware of the existence of the metallic shielding material, and will thus not be deterred from using the microwave steam cooking system of the invention in its intended manner. Consequently, efficient cooking of the foodstuff within the container will be achieved.

Referring more specifically to FIG. 4, the bottom 36 of the food container comprises a plurality of apertures 46 for directing the steam generated from heating the water within the water reservoir 12 into the cooking area of the food container 14. The outer wall portion 30 of the food container 14 is dimensioned and configured so that the outer surface 32 of the food container 14 contacts the inner surface of the second wall section 24 of the water reservoir 12 and sits on top of the support ledge 26 when the food container 14 is seated within the water reservoir 12.

The inner surface of the support ledge 26 and the inner surface of the curved portion of the second wall section 24 contacts the outer surface 32 of the container wall portion 30.

Referring more specifically to FIGS. 7 to 11, the second wall section 24 and the support ledge 26 of the water reservoir 12 include one or more channels 24a. The number of channels is preferably from two to four. Each of the one or more channels 24a forms a vent which extends from the interior of the water reservoir 12 to the upper edge of the water reservoir 12. The channels 24a allow ambient air into the water reservoir 12 and the container 14 when the microwave steam cooking container system is in the assembled configuration with the cover 18. The channels 24a thus prevent the possibility that a vacuum or underpressure is formed when the microwave steam cooking container system is removed from the microwave and the contents are allowed to cool down.

Referring more particularly to FIGS. 2, 4, and 5, the optional basket or strainer 16 includes a wall portion 48 that surrounds and extends upwardly from a bottom portion 50, and further includes an outwardly extending flared portion 52. When the optional basket or strainer 16 is used, the user can cook two items simultaneously. The optional basket 16 is primarily made from microwave transmitting material, such as, but not limited to, plastic. The diameter of the basket 16 is dimensioned such that it can be received within the food container 14 without the wall portion 48 coming into contact with the inner wall portion 38 of the food container 14, and the outwardly extending flared portion 52 is supported on the upper surface of the peripheral rim 54 of the food container 14.

The bottom portion 50 of the strainer 16 also includes a plurality of apertures 56 for directing steam generated from the heated water in the water reservoir 12 from beneath. As can readily be seen from FIGS. 2 and 4, the optional strainer 16 further includes a second plurality of apertures 64 disposed on an upper region 48a of the wall portion 48 for directing steam from the top onto the foodstuff, wherein, in combination with the steam directed from the plurality of apertures 56, the foodstuff is cooked with enveloping steam from the top and the bottom.

It is noted that the foodstuff is cooked primarily with steam when the cover 18 is placed on top of the optional basket 16 for shielding microwave radiation. Alternatively, the foodstuff can be cooked using a combination of steam and microwave radiation when the cover 18 is replaced with a cover or lid that does not contain the microwave shielding material, allowing the microwave radiation to be transmitted to the foodstuff.

The cover 18 is constructed in a similar manner to the food container 14, in that the cover 18 includes an outer wall portion 58, an inner wall portion 60, and a microwave shielding material, such as tin 62, or some other microwave shielding metal, or metal alloy, which is permanently encapsulated and overmolded between the outer wall portion 58 and inner wall portion 60. The outer 58 and inner 60 wall portions are primarily made from microwave transmitting material, such as, but not limited to, plastic.

The cover 18 is configured and dimensioned to be removably placed on the top opening of the basket 16, providing a complete microwave shield of the foodstuff to allow the foodstuff to be cooked using steam without exposure to microwave radiation.

While preferred embodiments of the invention have been shown and described, various modifications and substitutions may be made thereto without departing from the spirit and scope of the invention. Accordingly, it is to be understood that the present invention has been described by way of illustration only, and this description should not be construed as limiting to the several claims appended hereto.

What is claimed is:

1. A microwave steam cooking container system for cooking foodstuff, comprising:
   a water reservoir;
   a food container comprising a plurality of apertures on a bottom thereof, an outer wall portion and an inner wall portion, and a microwave shielding material encapsulated between said inner and outer wall portions;
   a strainer stacked and removably placed within the food container, said strainer comprising a bottom portion having a plurality of apertures extending completely through the bottom portion to allow liquid in the strainer to travel therethrough, and a wall portion extending upwardly from said bottom portion; and
   a cover comprising an inner wall portion and an outer wall portion, and a microwave shielding material encapsulated between said cover inner and said cover outer wall portions, wherein said food container is stacked and removably placed within said water reservoir, wherein in the assembled position, the foodstuff to be cooked is shielded from cooking by direct exposure to microwave energy;
   wherein the water reservoir comprises a bottom, a first wall section extending upwardly from the bottom, a support ledge at the upper edge of the first wall section and a second wall section extending upwardly from the support ledge; and wherein the second wall section and the support ledge of the water reservoir include one or more channels extending from the interior of the water reservoir to the upper edge of the water reservoir.

2. The microwave steam cooking container system of claim 1, wherein said wall portion of said strainer is positioned inwardly of the food container inner wall portion.

3. The microwave steam cooking container system of claim 1, wherein a pair of oppositely disposed portions extends upwardly from the second wall section and a pair of handles extends outwardly therefrom.

4. The microwave steam cooking container system of claim 1, wherein the number of channels is from two to four.

5. The microwave steam cooking container system of claim 1, wherein said wall portion of said strainer terminates in an outwardly extending flared portion.

6. The microwave steam cooking container system of claim 5, wherein said flared portion comprises a second plurality of apertures for directing steam into the strainer to envelop foodstuff contained therein.

7. The microwave steam cooking container system of claim 1, wherein said plurality of apertures extend across a substantial portion of said bottom portion.

\* \* \* \* \*